Figure 21:
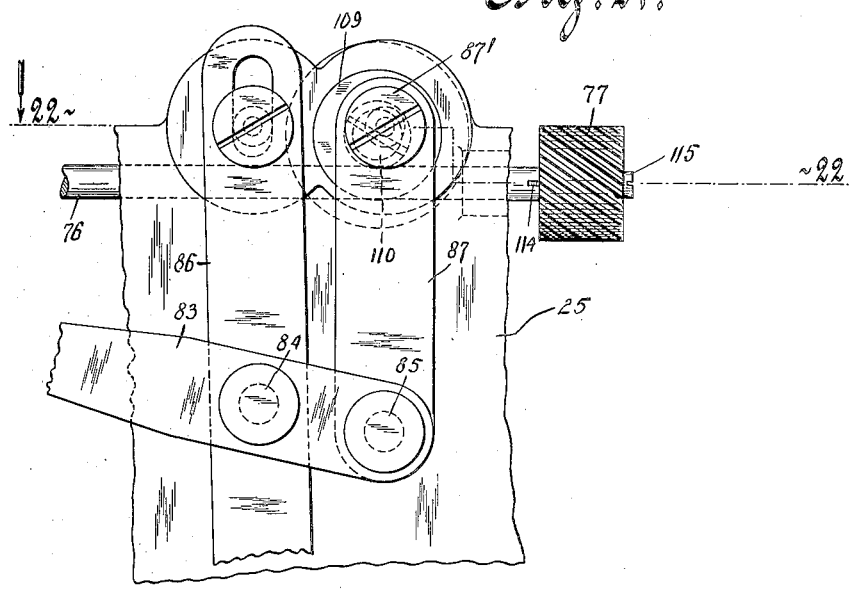

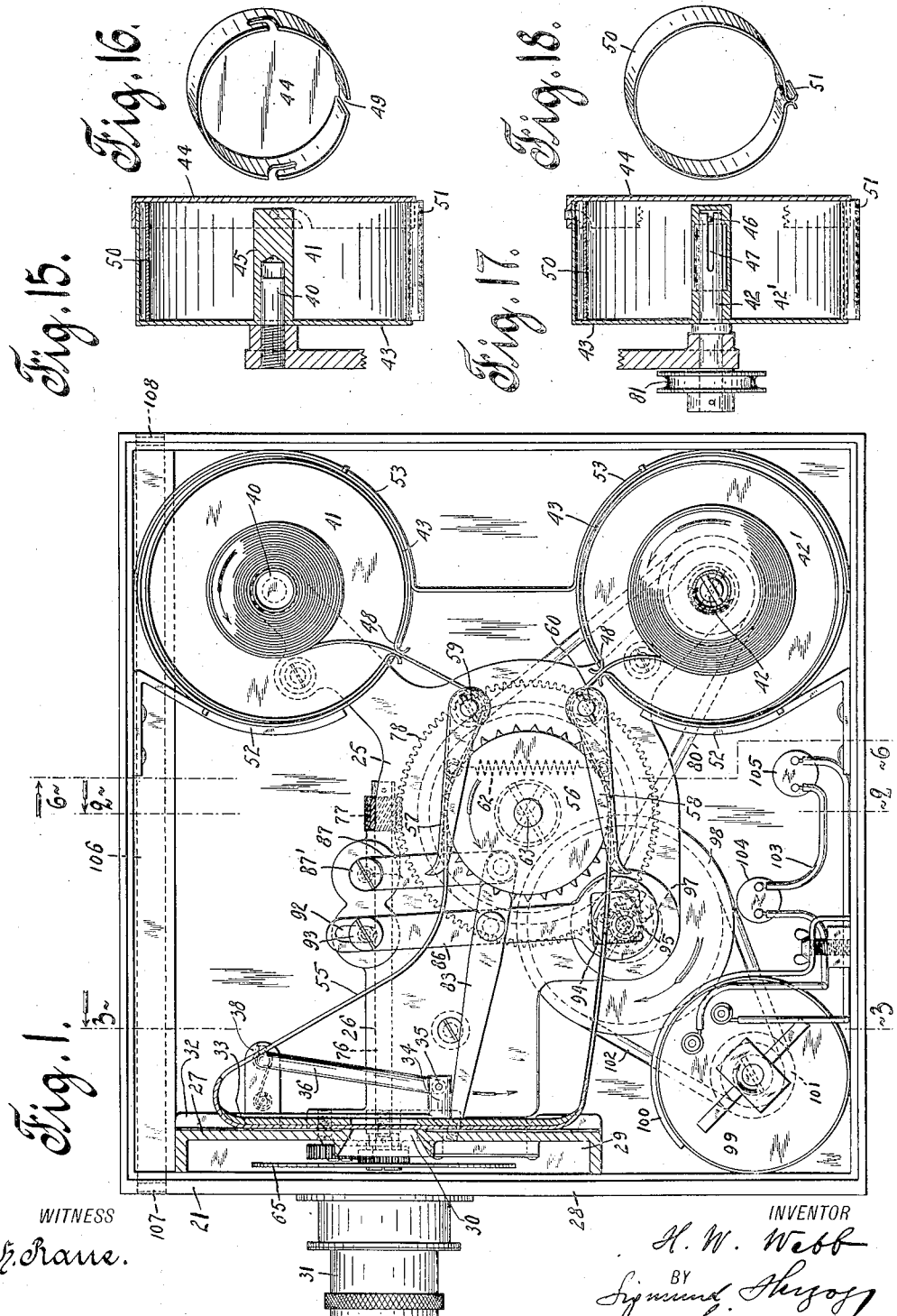

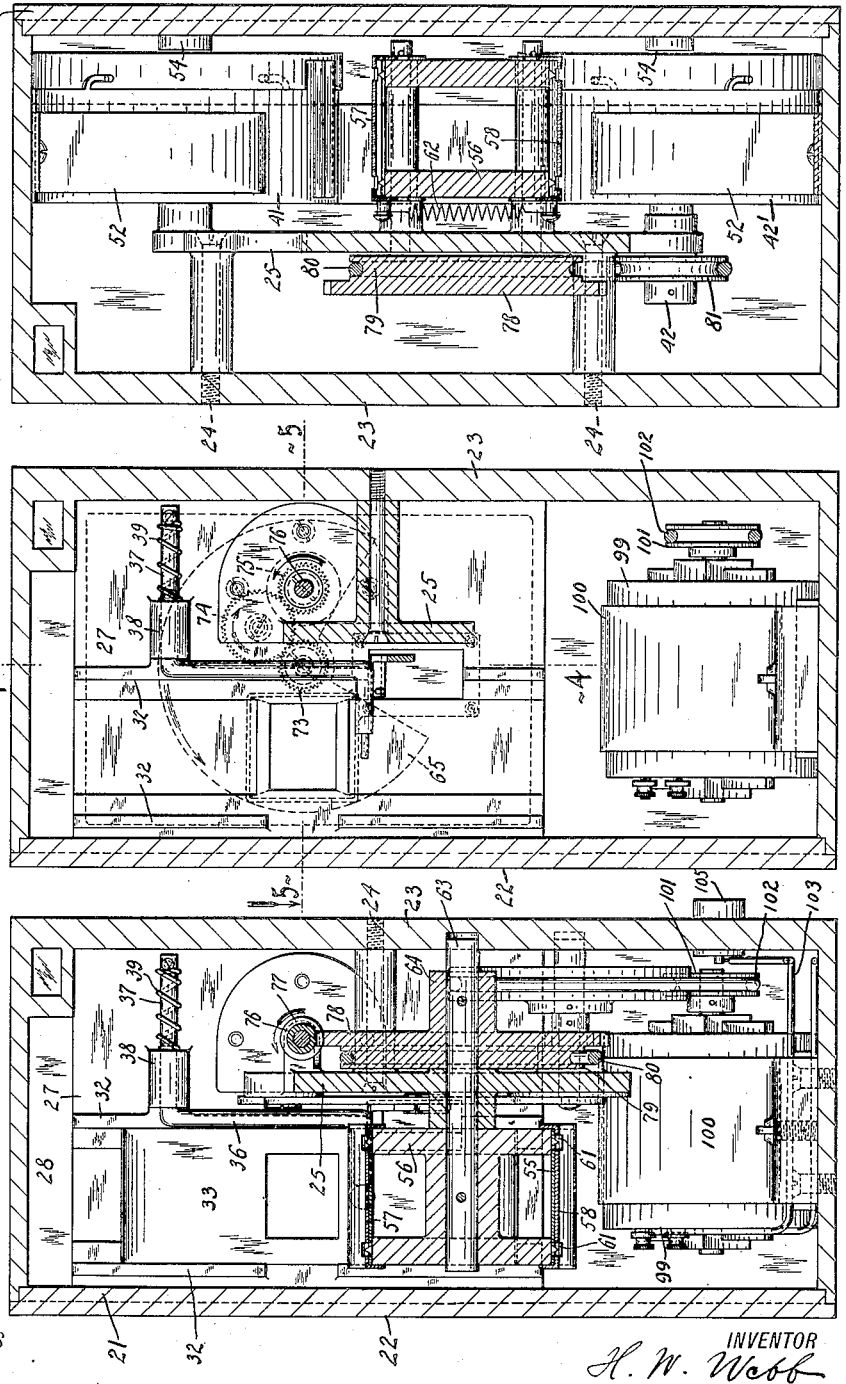

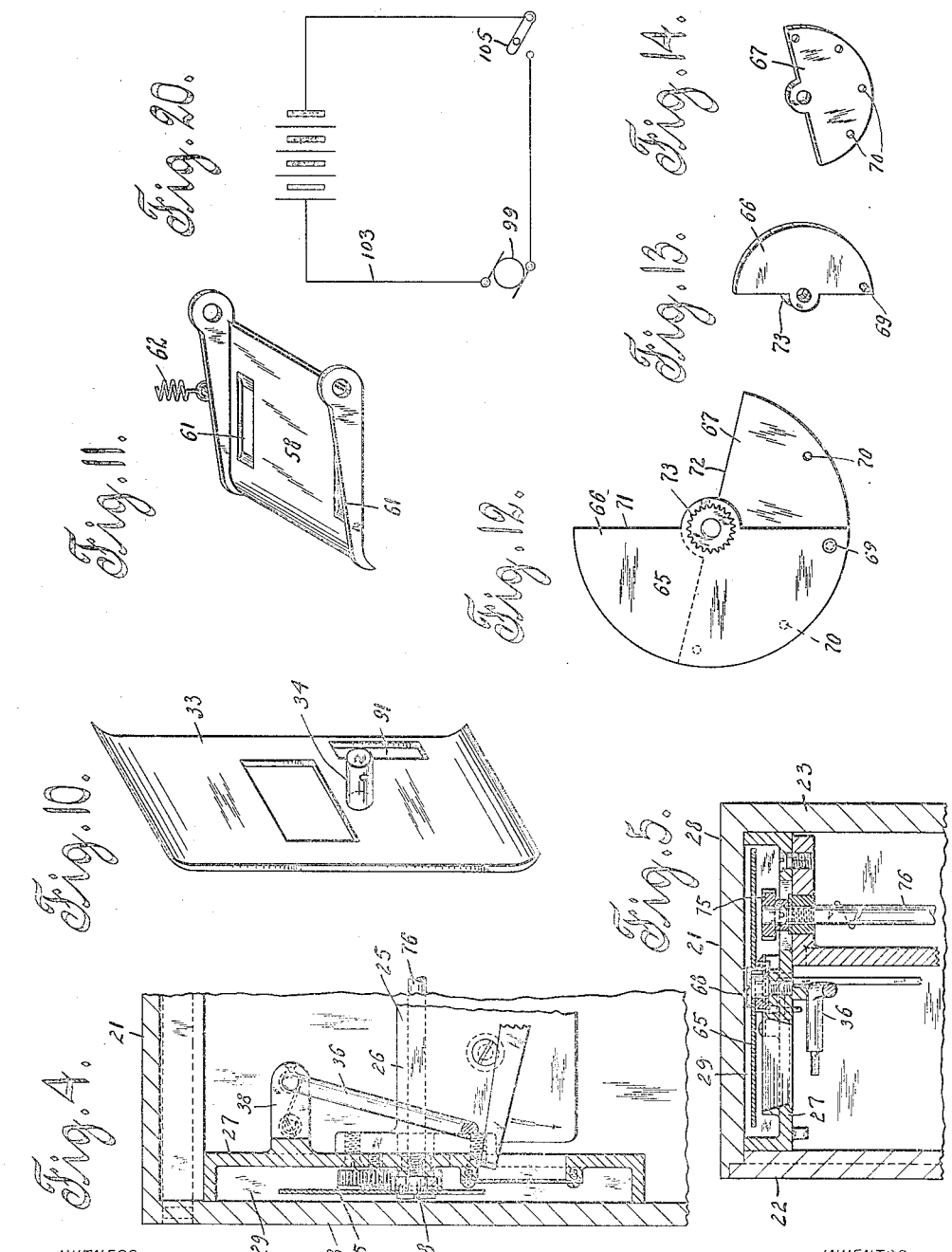

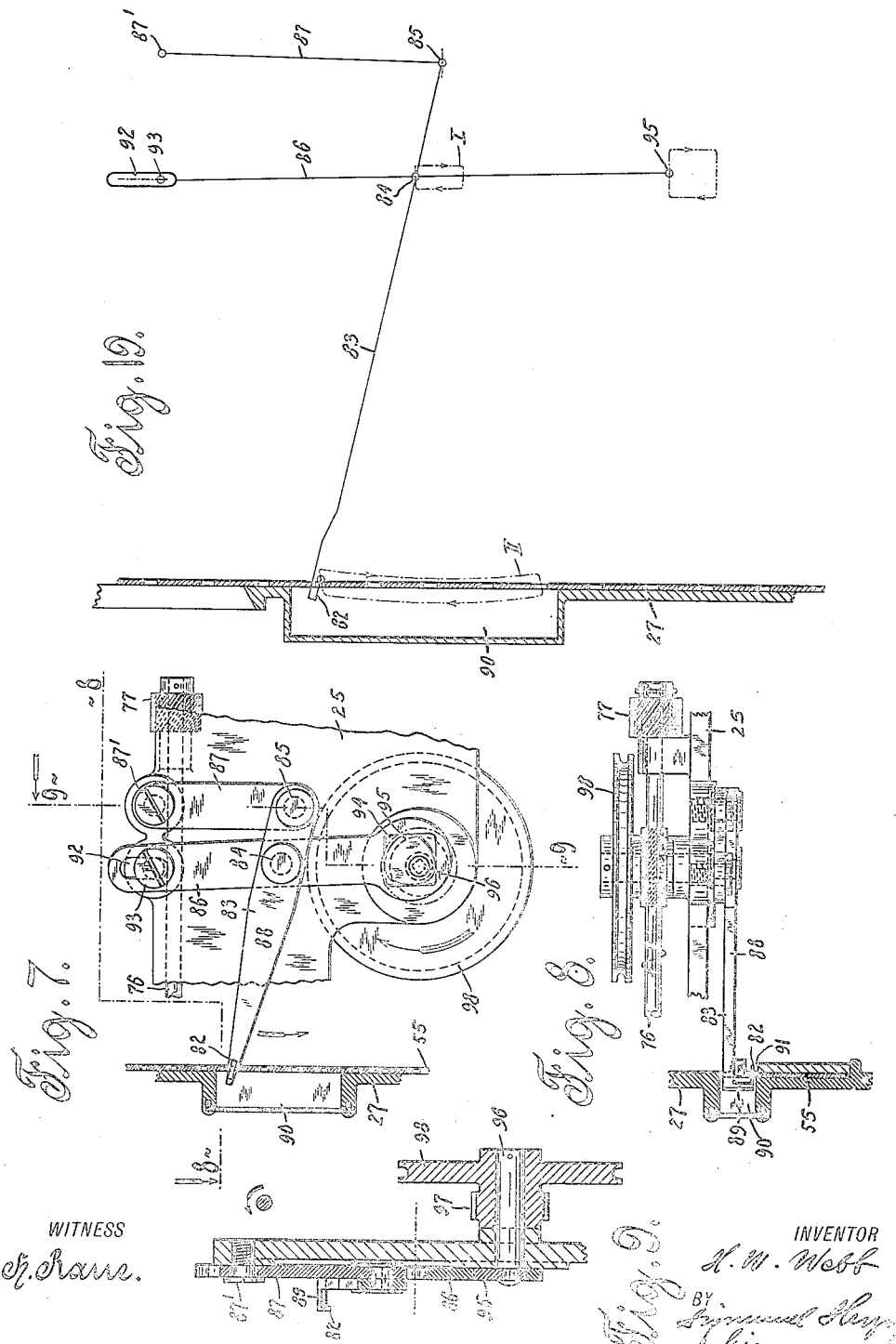

H. W. WEBB.
CINEMATOGRAPHIC APPARATUS.
APPLICATION FILED MAR. 15, 1916.

1,409,265.

Patented Mar. 14, 1922.
5 SHEETS—SHEET 5.

WITNESS
C. Crane.

INVENTOR
H. W. Webb
BY Sigmund Herzog
his ATTORNEY

UNITED STATES PATENT OFFICE.

HARTWELL W. WEBB, OF CRESSKILL, NEW JERSEY.

CINEMATOGRAPHIC APPARATUS.

1,409,265.　　　　Specification of Letters Patent.　　Patented Mar. 14, 1922.

Application filed March 15, 1916.　Serial No. 84,363.

*To all whom it may concern:*

Be it known that I, HARTWELL W. WEBB, a citizen of the United States, and a resident of Cresskill, in the county of Bergen and State of New Jersey, have invented certain new and useful Improvements in Cinematographic Apparatus, of which the following is a specification.

The present invention relates to an apparatus for exhibiting, or taking, respectively, of moving pictures, that is to say to a machine for exhibiting or taking, respectively, in rapid succession a series of photographs of a moving object or objects in such a manner as to produce an exact picture of the scene or object.

The invention relates more particularly to a mechanism for imparting an intermittent motion to the film past an exposure opening, in combination with other features as will hereinafter appear.

In most of the machines heretofore used the feeding mechanism consists of an intermittently rotating sprocket, to which motion is imparted by suitable means, for instance the well known "cross and pin" structure. It has been found in practice that the parts of this mechanism wear rapidly and have to be replaced at comparatively short intervals. Other feeding mechanisms comprise one or more fingers having a bodily oscillating movement, which upon the down stroke of their oscillation engage the film and advance it past the exposure opening, their upward strokes being idle. The devices of the second type are objectionable for the reason that an absolute register of the pictures of the film, or of the portions of the film on which the pictures are to be taken, is almost impossible.

One of the objects of the present invention is to provide a simple and effective feeding mechanism for cinematographic apparatus, which obviates the defects above mentioned in that its parts are not subjected to quick wear, and in that it insures a positive motion of the film and an absolute register with the exposure opening.

Another object of the invention is to provide a cinematographic apparatus in which all shafts or arbors rotate continuously notwithstanding the fact that the film is moved intermittently past the exposure opening.

A further object of the invention is to construct a gate associated with the exposure opening of the apparatus which permits of a convenient and easy insertion of the film between the guides on the sides of the exposure opening.

A still further object of the invention is to devise simple and efficient presser plates cooperating with the sprocket of the propelling mechanism, which plates allow of a convenient "threading" of the film band.

A further object of the invention is to produce a cinematographic camera that is motor driven, in combination with a switch which is mounted in such a manner upon the casing of the apparatus that the act of closing and keeping closed the switch causes the hands of the operator to assume such positions that the camera is kept steady during its operation.

A still further object of the invention is to construct a reel enclosing light-proof compartment, that is exceedingly simple in its construction and efficient in its operation.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 22:
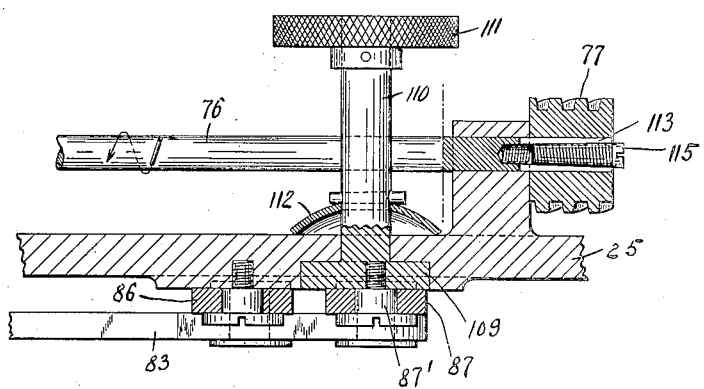

Figure 1 is a side elevation of an apparatus constructed in accordance with the present invention, partly in section, the cover of the enclosing casing and also those of the reel housings being removed in order to more clearly show the interior construction; Fig. 2 is a section taken on line 2—2 of Fig. 1; Fig. 3 is a section taken on line 3—3 of Fig. 1; Fig. 4 is a portion of a section taken on line 4—4 of Fig. 3; Fig. 5 is a portion of a section taken on line 5—5 of Fig. 3; Fig. 6 is a section taken on line 6—6 of Fig. 1; Fig. 7 is a side elevation of a detail of the film feeding mechanism; Fig. 8 is a section taken on line 8—8 of Fig. 7; Fig. 9 is a section taken on line 9—9 of Fig. 7; Fig. 10 is a perspective view of a gate associated with the exposure opening of the apparatus; Fig. 11 is a perspective view of a presser plate coöperating with the film feeding mechanism; Fig. 12 is a front elevation of the shutter of the apparatus; Figs. 13 and 14 are perspective views of the two sections constituting the shutter; Fig. 15 is a central section taken through the supply-reel and its enclosing housing; Fig. 16 is a perspective view of the cover of the reel enclosing housing; Fig. 17 is a central section taken through the wind-up reel and its enclosing housing; Fig. 18 is a perspective view of the light excluding means of the said housings; Fig. 19 is a diagram of the movement of certain elements of the film feeding mechanism; Fig. 20 is a diagram of the electric circuit of the motor actuating the film feeding mechanism; Fig. 21 is a side elevation of a modification of a detail of the film feeding mechanism; and Fig. 22 is a section taken on line 22—22 of Fig. 21.

In the drawings, the invention is shown in the form of a cinematographic camera, but the same, as will be hereinafter explained, is applicable to projecting apparatuses also, the film feeding mechanism in both cases being alike.

In the drawings, the numeral 21 indicates a suitable casing, adapted to enclose the mechanism and to exclude light. The side 22 of this casing is made in the form of a door, that is hinged to the casing and provided with a lock (not shown in the drawings). To the side 23 of the casing is bolted by screws 24, or otherwise attached, a frame 25, comprising a longitudinally extending section 26, that is arranged in parallel relation to the side 23 of the casing, and provided in front thereof with a transversely disposed section 27, the latter being located in parallel relation to and abutting against the front wall 28 of the casing. The sections 26 and 27 of the casing are shown in the drawings as being bolted together, but it will be understood that they may be cast in one integral piece. In the front face of the section 27 of the frame is provided a recess 29 for a purpose hereinafter to be described. In the frame section 27 is formed an exposure opening 30, which corresponds in size to that of an individual picture to be taken on the film band. With this exposure opening is arranged in registering position a lens-tube 31, in which is mounted a lens or a set of lenses, as the case may be.

The exposure opening is disposed between two parallel vertically extending ledges 32, which are formed upon the rear face of the frame section 27, the distance between said ledges corresponding to the width of the film band, and serving thus as a guide for the latter. With the exposure opening and the said ledges is associated a gate 33, that is provided with a rearwardly extending projection 34, which is pivotally engaged at 35 by a lever 36. This lever has a horizontally extending arm 37, fulcrumed on a lug 38 upon the frame section 27. Around this arm is coiled a spring 39, one end of which is fastened to said lug and the other end to the arm, thereby pressing the gate against the film band that travels between the frame section 27 and the said gate.

To the frame section 26 is fixedly attached a horizontally extending arbor 40, upon which is loosely mounted a supply reel 41. A spindle 42 is rotatably mounted in the frame section 26, and to this is keyed or otherwise attached the wind-up reel 42'. Each of these reels comprises a housing 43, having a detachable cover 44, which may be held upon the casing by any suitable means, for instance by bayonet catches, as illustrated in the drawings. The housings are provided with interior hubs 45, which are drawn over the arbor 40 and the spindle 42, respectively. The connection between the hub of the wind-up reel and the spindle 42 may be made by a pin 46, that extends through the hub of the wind-up reel, and is seated in a longitudinal slot 47 formed in the spindle 42. The reel housings are of cylindrical configuration, the width of which corresponds to that of the film band. In the cylindrical portion of each of the housings is provided a slot 48, that extends throughout the width thereof, and in alignment with this slot is formed in the cover a slot 49. The film band is drawn through these registering slots. In order to exclude light from the reel housings and for other reasons, which will appear hereinafter, there is disposed in each housing an annular spring band 50, the width of which corresponds to the interior width of the housing and the diameter of which is slightly smaller than the inner diameter of the housing. The ends of the spring band extend through the registering slots in the housing and cover, and are substantially semi-circular in shape, as clearly shown at 51, said semi-circular ends extending through the said registering slots and gripping the film band, extending through the said slots. Spring clips 52, bearing against the outer faces of the reels, hold the same in position upon the arbor and spindle, respectively, in cooperation with semi-circular stops 53, that are fixedly attached to the camera casing. To prevent the housings from shifting in the direction of the longitudinal axes of the arbor 40 and the spindle 42, respectively, there are formed upon the door 22 stops 54, which are juxtaposed to the covers 44 of said housings when the door is in its closed position. The spring bands 50 not only serve to exclude light from the reel housing, but by lightly gripping the film band prevent the same from being unrolled too fast from the wind-up reel as the film feeding mechanism is in operation or when its operation is being stopped. The wind-up reel may, of course, be mounted upon its arbor in broad daylight, whereby only such portion of the film band will be wasted that is threaded over the film feeding mechanism.

The film, denoted in the drawings by the numeral 55, is led from the supply reel to a continuously rotating sprocket 56, thence past the exposure opening between the ledges 27 and in front of the gate 33 downwards to the sprocket, and from there to the wind-up reel. Above and below the gate there are formed in the film band loops for the well known purpose. The film band is engaged by the sprocket at diametrically opposite points of the latter, and is kept continuously in engagement with said sprocket by two presser plates 57 and 58, which are oscillatably mounted upon spindles 59 and 60, respectively. One of these presser plates is disposed above and the other one below the sprocket, and each of the same is provided with slots 61 in alignment with the teeth of said sprocket. A spring 62 engages the two presser plates and keeps the same against the film band, that travels between the said presser plates and the sprocket. The sprocket is keyed or otherwise fixedly attached to a shaft 63, the said shaft being journaled in a bearing 64, formed upon the frame section 26.

With the exposure opening coacts a shutter 65, that is disposed in the recess 29 in the frame section 27. This shutter is made, as illustrated in Figs. 12 to 14, inclusive, of two parts 66 and 67, each of which is semi-circular and loosely mounted upon a screw bolt 68, that holds them rotatably upon the frame section 27. The two parts of the shutter are fixed together, for instance by providing upon the part 66 a pin 69, which is adapted to be seated in anyone of a row of holes 70, formed in the part 67. In this manner the distance between the leading edge 71 and the closing edge 72 of the shutter may be varied for the well known purpose. To one of the parts of the shutter, for instance the part 66, is fixedly attached a pinion 73, that is geared by the intermediary of a pinion 74 with a pinion 75, the latter being keyed or otherwise fixedly attached to a shaft 76, which is journaled in bearings upon the two frame sections, and carries upon its rear end an oblique toothed pinion 77, in mesh with an oblique toothed gear 78, that is keyed or otherwise fixedly attached to the shaft 63. With the gear 78 is made, for instance, integral a pulley 79, over which runs a belt 80, that runs also over a pulley 81, the latter being attached to the spindle 42 of the wind-up reel.

The means for intermittently feeding the film band past the exposure opening comprises a feeding finger 82, which is carried by an arm 83, that is fulcrumed at 84 and 85 to a lever 86 and a link 87, respectively. This arm comprises two sections, denoted by the numerals 88 and 89, the section 88 being disposed parallel to the frame section 26, and the section 89 being bent at right angles thereto. The section 88 of the arm extends into a recess 90 in the frame section 27, the finger 82 thereon projecting rearwards through a slot 91 in the gate, said slot being in alignment with said recess. The link 87 is pivoted at 87' to the frame section 26. The lever 86 extends substantially vertically, and is provided at its upper end with a longitudinal slot 92, in which is seated a pin, in the form of a screw 93, about which the said lever is adapted to oscillate and to move substantially in the direction of its longitudinal axis. In the lower end of the lever is formed a substantially square opening 94, in which is seated a cam 95, said cam being mounted upon a spindle 96, which is journaled in the frame section 26, and has fixedly attached thereto an oblique toothed pinion 97, in mesh with the oblique toothed gear 78. Upon this spindle is also mounted a pulley 98, that acts at the same time as a fly-wheel for the well known purpose.

The film feeding mechanism is actuated by an electric motor 99, that is held within the camera casing by a clip 100. The motor shaft is provided with a pulley 101, over which and over the pulley 98 runs a belt 102. In the motor circuit 103 is inserted a socket 104, which extends through the side wall 23 of the casing and is adapted to receive a plug (not shown), the latter being connected with the terminals of an electric battery. The battery is preferably mounted in a satchel or similar device, provided with means for attaching it to the body of the operator. In the motor circuit is furthermore inserted a switch, in the form of a push-button 105, that is slidably mounted upon the side 23 of the casing.

With the camera is associated a finder, in the form of a tube 106, that extends from the front wall to the rear wall of the casing, and is provided at its front end with a lens 107 and at its rear end with a groundglass plate 108 for the well known purpose.

The operation of the film feeding mechanism is as follows: When the switch 105 of the motor circuit is closed, a continuous rotation is imparted to the sprocket 56, with the result that the film band is unwound from the supply reel and rewound upon the wind-up reel. The cam 95 rotates also continuously, actuating, however, the feeding finger in such a manner that an intermittent movement of the film band is obtained past the exposure opening. The cam 95, in cooperation with the horizontal working faces of the opening 94 in the lever 86, causes the latter to move up and down in the direction of its longitudinal axis, and in cooperation with the vertical working faces of the opening 94 to swing toward and away from the frame section 27 about the pivot 93. The fulcrum 84 of the arm 83 describes therefore an oblong figure, denoted by the numeral I in Fig. 19, and, inasmuch as this arm is fulcrumed at 85 to the link 87, the finger 82 describes an oblong figure, denoted by the numeral II in Fig. 19. The finger is thus caused to engage a perforation in the film when it arrives at its uppermost position and moves somewhat rearwards. When the finger arrives at the end of its rearward movement, the finger 82 is caused to swing downwards, whereby the film band is advanced. When the finger arrives at or near its lowermost position, it is disengaged from the band, or in other words it moves forwards. When moving upwards, the finger is out of engagement with the film band, so that the latter remains stationary. The cycle of operation is repeated at each revolution of the spindle 96.

As mentioned above, the camera is provided with a self-contained motor, in the circuit of which is inserted on one of the side walls of the casing a push-button. In taking the pictures, the operator holds the camera in both of his hands and presses the same against his body, say for instance against the chest so that one of his eyes is in alignment with the finder of the camera. As he now presses the push-button to close the motor circuit, the pressure exerted by one of his hands steadies the camera, whereby the same will be held safely against movement. Inasmuch as the camera is motor operated and steadied in the manner above described, it is not open to the objection of the crank operated cameras, in which the camera is always held by one of the hands of the operator, the crank being operated by the other hand, whereby the camera is continuously vibrated, with the result that often blurred pictures are obtained upon the film band.

While herein a camera has been shown and described, it is obvious that the film advancing mechanism may just as well be made use of in a projecting apparatus. If used for the latter purpose, the supply reel and the wind-up reel need not be enclosed by light-proof housings; furthermore a source of light in combination with a suitable lens must be provided. These changes, however, are so obvious to those skilled in the art that a further discussion of the same seems to be unnecessary.

If the film advancing mechanism is used in connection with a projecting apparatus, there may be combined therewith a framing means, as illustrated in Figs. 21 and 22 of the drawings. In this instance the link 87 is eccentrically fulcrumed at 87' to a disk 109, that is rotatably mounted in the frame section 26, its spindle 110 being provided with a milled knob 111, to facilitate the handling thereof. A spring 112 serves to keep the disk fixed in position. By turning the disk 109 in one or the other direction, the uppermost and lowermost positions of the feeding finger are varied. The purpose of this arrangement is to frame the picture on the film band, or in other words to bring the individual picture in proper relation to the exposure opening of the apparatus.

If a one-part shutter is used, it becomes from time to time necessary to vary the relative positions of the shutter and the exposure opening. For this purpose the structure illustrated in Figs. 21 and 22 may be made use of. In this construction the end of the shutter shaft 76, over which the pinion 77 is drawn, is provided with a screw threaded tapered bore 113, and with longitudinal slots 114. With the threads of the bore meshes a tapered screw bolt 115. If it is intended to vary the relation of the shutter and the exposure opening, the screw bolt 115 is unscrewed from the bore 113, and the shaft 76 given a partial turn according to the distance to which the shutter is to be shifted in relation to the exposure opening, after which the bolt 115 is again screwed up, thereby distending the bored end of the shaft and fixedly attaching the same to the pinion 77.

What I claim is:—

1. A hand camera comprising a casing, a film propelling mechanism therein, an electric motor within said casing for actuating said film propelling mechanism and a switch in the circuit of said motor, said switch being mounted on one of the sides of the casing and including a push button operable by pressure of the hand of the operator against the side of the casing.

2. A hand camera comprising a casing, a film propelling mechanism therein, an electric motor within said casing for actuating said film propelling mechanism and a switch in the circuit of said motor, said switch being mounted on one of the sides of the casing and including a controlling member operable by the pressure of one of the hands of the operator toward the resisting pressure of the other hand and against the intervening casing.

3. A hand camera comprising a casing, a film propelling mechanism in said casing, a motor within said casing for actuating said film propelling mechanism, a controlling device for said motor, said controlling device being mounted on one of the sides of the casing and including a controlling member operable by pressure of one of the hands of the operator toward the resisting pressure of the other hand and against the intervening casing.

Signed at New York, in the county of New York, and State of New York, this 3rd day of March A. D. 1916.

HARTWELL W. WEBB.